US011943684B2

(12) United States Patent
Avetoom

(10) Patent No.: US 11,943,684 B2
(45) Date of Patent: *Mar. 26, 2024

(54) SYSTEMS AND METHODS FOR IMPROVED ACCESS TO USER DATA

(71) Applicant: T-Mobile USA, Inc., Bellevue, WA (US)

(72) Inventor: Paul Avetoom, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/960,645

(22) Filed: Oct. 5, 2022

(65) Prior Publication Data
US 2023/0023557 A1  Jan. 26, 2023

Related U.S. Application Data

(63) Continuation of application No. 16/941,067, filed on Jul. 28, 2020, now Pat. No. 11,470,454.

(51) Int. Cl.
*H04W 4/14* (2009.01)
*H04L 67/02* (2022.01)
*H04W 12/06* (2021.01)

(52) U.S. Cl.
CPC ............. *H04W 4/14* (2013.01); *H04L 67/02* (2013.01); *H04W 12/06* (2013.01)

(58) Field of Classification Search
CPC ........ H04L 67/51; H04L 67/02; H04W 60/00; H04W 8/08; H04W 48/18
See application file for complete search history.

(56) References Cited

U.S. PATENT DOCUMENTS 8,005,459 B2 * 8/2011 Balsillie ................ H04W 12/06
455/410
2018/0262533 A1 * 9/2018 McCaig .............. H04L 63/1441

OTHER PUBLICATIONS

ETSI TS 129 518 V15.6.0 (Jan. 2020), Technical Specification, 5G; 5G System, Access and Mobility Management Services; Stage 3 (3GPP TS 29.518 version 15.6.0 Release 15 (Year: 2020).*

* cited by examiner

*Primary Examiner* — Chirag R Patel
(74) *Attorney, Agent, or Firm* — Lee & Hayes P.C.

(57) ABSTRACT

A computer-implemented method for providing user data for a user in a cellular network. The method comprises receiving a request for user data from a requesting entity. The method includes providing login credentials associated with the requesting entity to a short message service function (SMSF), and querying the SMSF for user data. The method includes receiving user data in response to the query and parsing the received user data. The method includes converting the received user data to an API response and transmitting the converted user data to the requesting entity.

19 Claims, 6 Drawing Sheets

SYSTEMS AND METHODS FOR IMPROVED ACCESS TO USER DATA

CROSS-REFERENCE TO RELATED APPLICATIONS

This application is a continuation application of U.S. application Ser. No. 16/941,067, filed on Jul. 28, 2020, the entirety of which is hereby incorporated by reference.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Agents or applications related to a network provider, such as a cellular communications or data provider, may periodically seek access to data for particular or groups of telecom customers or pertaining to user equipment (e.g., mobile phones, tablets, personal computers, etc.). For example, certain customer service scenarios may be addressed at least partially by an agent accessing user data or UE data for a user or customer, such as connectivity data, plan data, etc. Traditionally, however, accessing particular types of data may be technically burdensome, time consuming, and/or computationally inefficient.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for providing user data for a user in a cellular network. The method may include receiving a representational state transfer (REST) application programming interface (API) request from a computing device of a requesting entity. The REST API request may include a user identifier of the user. The method may include, in response to receiving the REST API request, providing login credentials associated with the requesting entity to a short message service function (SMSF), wherein the SMSF is configured to authenticate the login credentials with a network repository function (NRF). In response to authenticating the login credentials, the method may include querying the SMSF for a user equipment (UE) context resource based on the user identifier. The method may include receiving the UE context resource in response to the query, parsing the received UE context resource, and converting the received UE context resource to a REST API response. The method may include transmitting the REST API response to the computing device of the requesting entity.

In another embodiment, the disclosure describes a computer-implemented method for providing user data for a user in a cellular network, the method may include receiving a request for a user equipment (UE) context resource from a computing device of a requesting entity. The request for the UE context resource may include a user identifier of the user. The method may include providing login credentials associated with the requesting entity to a short message service function (SMSF), and querying the SMSF for the UE context resource based on the user identifier. The method may include receiving the UE context resource from the SMSF in response to the query, parsing the received UE context resource, and converting the received UE context resource to an application programming interface (API) response. The method may include transmitting the converted UE context resource to the computing device of the requesting entity.

In another embodiment, the disclosure describes a system for providing access to user data for a user in a cellular network. The system may include a computing device associated with a requesting entity, a control node of the cellular network, and a client system. The client system may include an application programming interface (API) configured to receive a request for user data from the computing device of the requesting entity, where the request for user data including a user identifier of the user. The API may be configured to query the control node for user data based on the user identifier, receive user data in response to the query, and parse the received user data. The API may be configured to convert the received user data to a REST API response, and transmit the REST API response to the computing device of the requesting entity.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
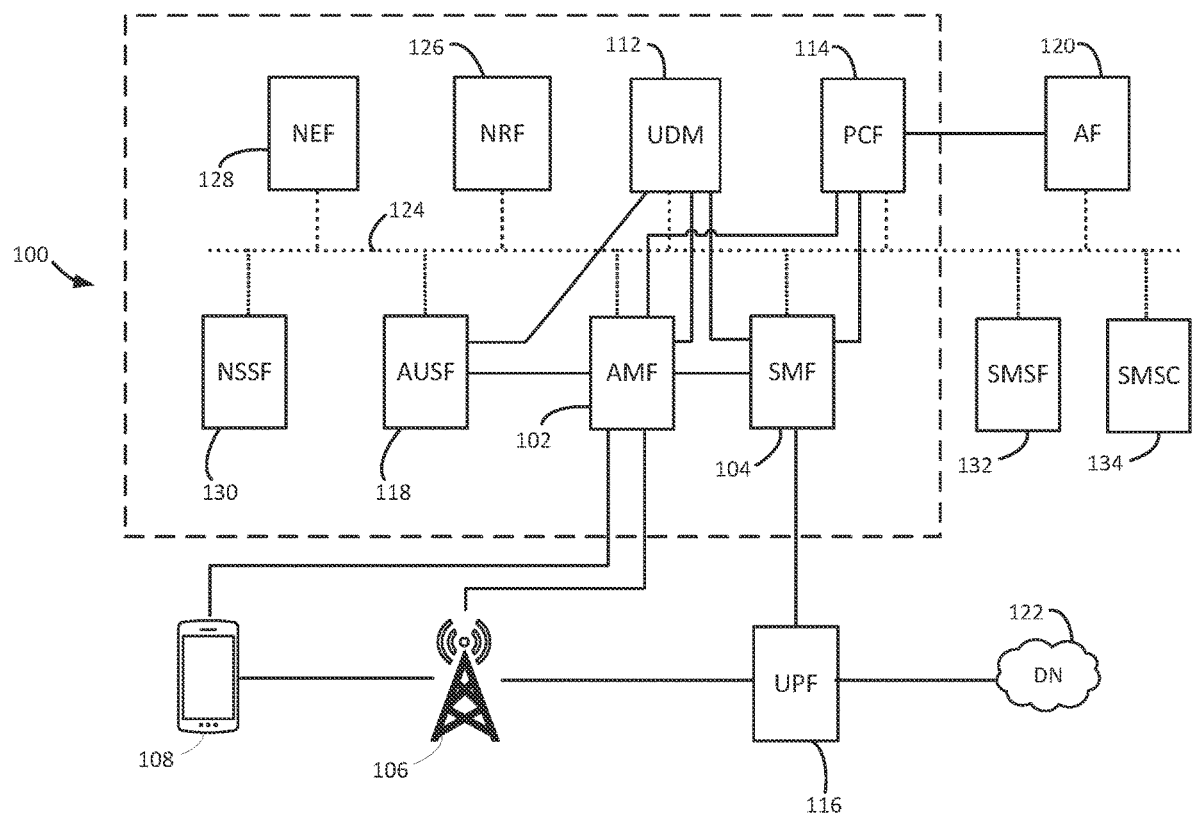
FIG. 1 is a high level diagram of an embodiment of a network environment for a system and methods for improved access to user data in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Network operators or providers, such as entities providing cellular phone and data service, may use various hardware, software, or other tools and systems to review and manage network data and customer service. In some embodiments, network operators may provide systems and methods to access user data or data pertaining to a user's particular user equipment (UE) so that agents or applications of the network operator may access data or information, for example, while troubleshooting, assessing service quality, etc. In some embodiments, access to user or UE data may only be achieved by subscribing for updates to a particular user's or UE's data, waiting for updates to that data to be received from a database, system, or other source, then unsubscribing from the same updates to stop receiving that information. In some embodiments, traditionally, an entity seeking such user data may not simply obtain the current data for that user without going through the subscription process described above.

For example, in 5G systems, a client system (e.g., network operator, troubleshooting, customer service entity, etc.) may need to retrieve user data from a control node for the 5G network, such as an access and mobility management function (AMF) or a short message service function (SMSF). In some embodiments, the SMSF may be accessed via a SMSF Representational State Transfer (REST) interface. In some embodiments, the SMSF specification related to the SMSF REST interface may be 3GPP TS 29 518 Release 16, but other specifications may be developed and implemented periodically that may work in a similar or equivalent manner. Traditionally, under the SMSF or AMF specification, a client system may subscribe to updates to user data on the SMSF or the AMF, but may not be able to obtain the current data directly without subscribing, receiving updates, and unsubscribing to that user's or user UE's updates. Similar restrictions may apply to accessing data of users in the LTE network domain, using a mobility management entity (MME) as a control node. The result may be slow, inefficient, and computer resources intensive access to user data, which may slow response to network problems, increase computing resources required to access the information, and generally reduce network efficiency, quality of service, and customer service efficiency.

The disclosure describes a system and methods for improved access to user data that may provide increased efficiency, fewer computer resources, and faster user service troubleshooting, among other benefits and technical improvements. In some embodiments, a client system may obtain current data for a particular user or customer UE using manual steps via the SMSF REST interface for a SMSF. In some embodiments, the client system may be programmed to perform similar steps automatically based on inputs from a requesting entity. In some embodiments, the disclosure describes an application programming interface (API) that may receive input from a requesting entity, may interface with the SMSF REST interface for a SMSF, and may return user data for a particular user. In some embodiments, the system may allow any application or entity registered with a network repository function (NRF) (e.g., as an network function (NF)) to provide subscription, location, detailed registration information, etc., over the SMSF REST interface. In some embodiments, the system may provide access to this information without registering or subscribing for notification updates.

In some embodiments, the system may provide access to user data in one of a variety of ways via the SMSF REST interface or other suitable interface. For example, in some embodiments, an application or entity may send an HTTP POST request to the client system or SMSF to initiate retrieval of user data. In some embodiments, the POST request may have a zero duration notification. In some embodiments, an application or entity may send a HTTP GET request to the client system or SMSF via the SMSF REST interface or other suitable means. In some embodiments, an application or other entity may request user data by sending a GET, POST, or other type of request to an API programed to retrieve the requested user data from the SMSF. In some embodiments, an application or other entity may use an API to request a particular user's registration data, and a user data API may include HTTP POST and/or HTTP GET requests. In such embodiments, the API may interface with the REST API and the SMSF, and may include a user interface or graphical user interface (GUI) that may receive identifying user information (e.g., international mobile subscriber information (IMSI), mobile station integrated services digital network (MSISDN), etc.) for the desired user. The system and method described herein may allow identification of subscriber registration in a 5G, LTE, or other network substantially close to the edge of the core network as possible. In some embodiments, the system and methods may also allow for the identification of the serving cell, current cell identification (CID), last CID, etc., that may be used in fault identification and triangulation, among other things. In some embodiments, the data sought and retrieved associated with a particular user or customer UE may be a UE context resource. In some embodiments, the UE context resource may include information to maintain network services for the customer's UE, such as UE state information, security information, UE capability information, identities of UE-associated connections, etc, and other information that may be useful for troubleshooting and other inquiries.

FIG. 1 shows an embodiment of an example of a networking and computing architecture 100 in which the system and methods for improved access to UE context information may exist. The architecture 100 may include an AMF 102 that may connected to a session management function (SMF) 104, a base station (e.g., g node B (gNB)) 106, user equipment (UE) 108, authentication server function (AUSF) 110, unified data management (UDM) 112, policy control function (PCF) 114, and short message service function (SMSF) 132. The AMF 102 may be connected to and/or communicate with each part of the architecture via various interfaces and protocols, such as N1, N2, N12, N15, N8, N20, Nsmsf, etc. The SMF 104 may be connected to or interface with the AMF 102, the UDM 112, the PCF 114, and the user plane function (UPF) 116. The SMF 104 may connect or interface with the other nodes via one or more interfaces or protocols, such as N11, N10, N7, N4, etc. The gNB 106 may connect or interface with the AMF 102, the UE 108, and the UPF 116 via one or more protocols or interfaces such as N6, N2, N3, etc. The AUSF 118 may connect to or interface with the AMF 102 and the UDM 112 via protocols or interfaces such as N12, N13, etc. The PCF 114 may be connected to or interface with AMF 102, the SMF 104, and an application function (AF) 120 via protocols or interfaces such as N7, N8, N5, etc. The UPF 116 may be connected to or interface with the SMF 104, the gNB 106, and a data network (DN) 122 via protocols or interfaces such as N3, N4, N6, etc. The AMF 102 and other system elements may also communicate with or otherwise interface various other nodes via a message bus such as a serial bus interface (SBI) message bus 124. For example, the AMF 102 and other elements may communicate with a network repository function (NRF) 126, a network exposure function (NEF) 128, a network slice selection function (NSSF) 130, the AF 120, the SMSF 132, and the short message service center (SMSC) 134 via the SBI message bus 124.

In some embodiments, such as in some 5G networks, the SMF 104 may be a fundamental element of the service-based architecture (SBA). In some embodiments, the SMF 104 may be responsible for interacting with the decoupled data plane, creating, updating and removing Protocol Data Unit (PDU) sessions, and managing session context with the UPF 116. Both the UE 108 and the gNB 106 may use next generation application protocol (NGAP) to carry non-access stratum (NAS) messages across N1 or N2 reference interfaces in order to request a new session. The AMF 102 may receive these requests and may handle connection or mobility management while forwarding session management requirements over the interface (e.g., N11) to the SMF 104. The AMF 102 may determine which SMF 104 may be best suited to handle the connection request by querying the NRF 126. The interface between the NRF 126 and the AMF 102 and the interface (e.g., N11) between the AMF and the specific SMF 104 assigned by the NRF may use the SBI message bus 124, to which most or all of the system elements may be connected. In some embodiments, the SBI message bus 124 may employ RESTful API principles over HTTP/2.

In some embodiments, the NRF 126 may maintain a repository of the 5G elements available in the operator's network along with services provided by each of the elements in the 5G core that are expected to be instantiated, scaled, and terminated with minimal manual intervention, if any. The NRF 126 may also support discovery mechanisms that may allow network elements to discover each other and get updated status of the desired elements. The NRF 126 may maintain the profiles of the available network function (NF) instances and supported services in the core network. The NRF 126 may also allow consumer NF instances to discover other providers NF instances in the core network (e.g., 5G core network). The NRF 126 may also allow NF instances to track the status of other NF instances. In some embodiments, the NRF 126 may interact with substantially every other element in the 5G core network and may support the above functions through management services and discovery services.

In some embodiments, the SMSF 132 may support the transfer of short message service (SMS) messages over the NAS. In such embodiments, the SMSF 132 may conduct subscription checking and perform relay functions between the UE and the SMSC 134, which may occur through interaction with the AMF 102. In some embodiments, the SMSF 132 may interface with the AMF 102 via the Nsmsf service based interface. In some embodiments, the SMSC 134 may perform various tasks related to providing SMS delivery. For example, the SMSC 134 may receive SMS messages from wireless network users, store SMS messages, forward SMS messages to recipients, deliver SMS messages to wireless network users, maintain unique time stamps in SMS messages, store an SMS message until a recipient user is available to receive the message, etc. In some embodiments, the SMSF 132 and the SMSC 134 may be combined. In some embodiments, the SMSF 132 and the SMSC 134 may communicate via mobile application part (MAP) or Diameter protocols or other suitable protocols in other embodiments. In some embodiments, the SMSF 132 may communicate or interface with the UDM 112 using N21/Nudm protocols.

In some embodiments, the SMSF 132 may support various services, such as allowing the AMF 102 to authorize, activate, deactivate, and update the SMS for network users. The SMSF 132 may also provide UplinkSMS services to the AMF 102. Activating service may activate SMS service for a network user, which may result in creating or updating a UE context for SMS in the SMSF 132. Deactivating service may deactivate service for a network user, which may result in deleting a UE context for SMS in the SMSF 132. UplinkSMS service may send an SMS payload in the uplink direction to the SMSF 132 from the AMF 102.

Figure 2:
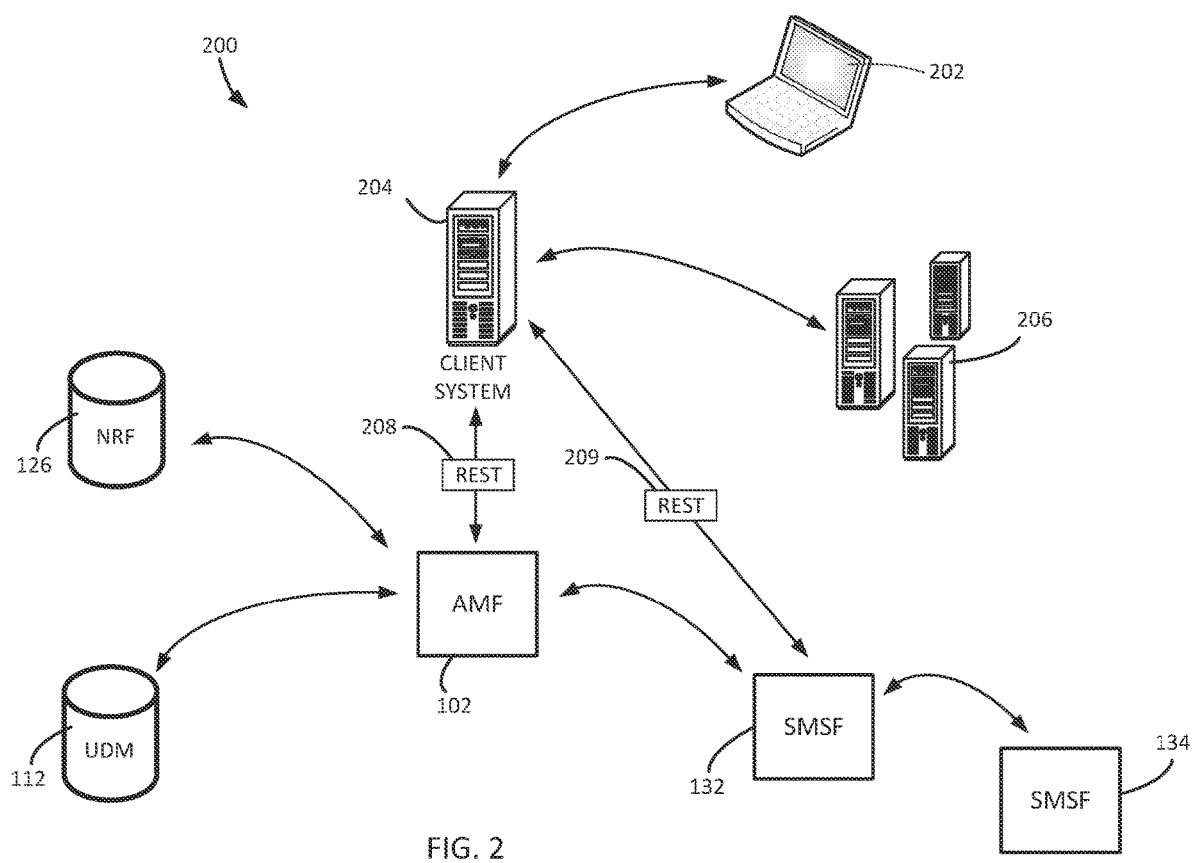
FIG. 2 is a high level diagram of an embodiment of a computing environment for the system for improved access to user data of FIG. 1

FIG. 2 shows an embodiment of a computer environment 200 in which embodiments of the disclosed system for improved access to UE context information may operate. In some embodiments, the computing environment 200 may include at least one client system 204 that may be connected to or capable of connecting to one or more requesting entity computing devices 202 and/or one or more requesting entity servers 206. In some embodiments, the client system 204 may be a server-type computing device specially configured to operate the system for improved access to UE context information and/or a UE context API configured to receive requests and return user data as disclosed herein. The requesting entity computing device 202 may be any type of suitable computing device capable of interfacing with the client system 204 via a data network such as the Internet, a local area network, a direct or wireless connection, using any suitable interface known to those skilled in the art, such as HTTP, simple object access protocol (SOAP), REST, etc. The requesting entity servers 206 may be any of a variety of servers hosting applications or other entities that may request UE context information from the client system 204. In some embodiments, the UE context API may run on the requesting entity computer device 202 and/or the requesting entity server 206 and provide for sending requests to the client system 204 or AMF 102. The client system 204 may interface with one or more AMFs, such as AMF 102 described in reference to FIG. 1. In some embodiments, the client system 204 may interface with the AMF 102 via a REST interface and, more specifically, an AMF REST interface. The AMF 102 may be a traffic node in the system that may record any changes to UE context information. The AMF 102 may connect or otherwise interface with the UDM 112, the SMSF 132, and the SMSC 134. Any time a user or network provider makes changes to the UE context associated with a user or UE, the changes may be updated on the SMSF 132. In some embodiments, the UE context information may include substantially all information for a particular user registered on a particular node, particularly information associated with a user SMS subscription details and allowances. The SMSF 132 may, among other things, perform SMS management subscription data checking and conduct SMS delivery accordingly. Further details on example embodiments of these connections and associated interfaces are described in reference to FIG. 1 above.

Figure 3:
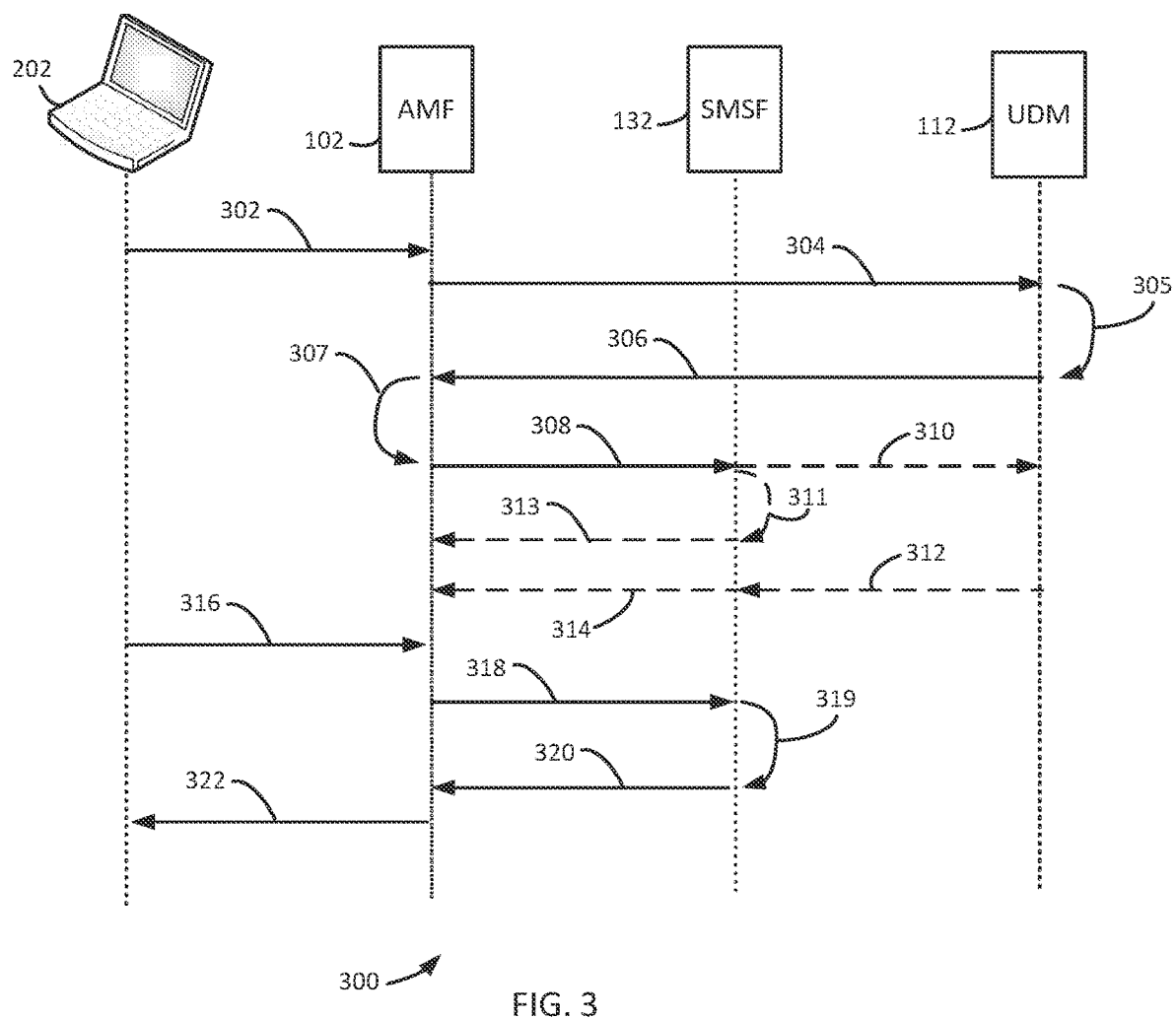
FIG. 3 is a data flow diagram of components of an embodiment of the system for improved access to user data.

FIG. 3 shows an embodiment of data flow diagram 300 for example data traffic between the AMF 102, the UE 108, the SMSF 132, and the UDM 112. Those skilled in the art will understand that the data flow shown in FIG. 2 is merely an example and that other data flows consistent with the scope of the disclosure may be used as well. At 302, an entity, such as a requesting entity, another entity associated with a network provider, or a network user using a UE, may transmit a registration request to the AMF 102. In some embodiments, the registration request may include information identifying the user equipment of a user or the account or account information of a particular user for which SMS services are to be activated. In some embodiments, the identifying information may be a "International Mobile Subscriber Identity" (IMSI), which may be a unique number associated with the particular customer's UE or subscriber account. In some embodiments, the registration request may be submitted through an intermediary system, such as the client system 204, via an API, user interface, or other interfacing protocol. At 304, in some embodiments, the AMF 102 may request or otherwise access the network subscription information for the user or a particular UE associated with the user from the UDM 112. In some embodiments, the UDM 112 may manage network user data or user data, provide authentication credentials, and be employed by the AMF 102 and SMF 104 to retrieve network customer/user or subscriber data and context. At 305, the UDM may retrieve the subscription information for the user and, at 306, transmit the subscription information back to the AMF 102 that requested it. Specifically, the subscription information may include SMS subscription information. At 307, the AMF 102 may determine, based on the retrieved subscription information, whether the particular user and/or customer UE is authorized for SMS services. If so, the AMF 102 may discover and/or select an SMSF, such as SMSF 132 that may be used to provide SMS services to the customer UE.

At 308, in some embodiments, the AMF 102 may activate SMS service for the particular user or customer UE. In some embodiments, the activation may occur by the AMF 102 sending an HTTP PUT request to the SMSF 132 or, more specifically, to a resource in the SMSF representing the UE context for SMS. In some embodiments, the payload of the PUT request may include a representation of the individual UE context resource to be created or updated (e.g., UeSmsContextData). In some embodiments, if the designated UE context for SMS does not yet exist in the SMSF 132, the SMSF may, at 310, request subscription data for the particular customer UE from the UDM 112. The UDM 112 may, at 312, transmit the requested subscription data to the SMSF 132, and the SMSF may perform service authorization for the customer UE and create the UE context resource for the particular customer UE. In some embodiments, at 314, the SMSF 132 may transmit a success response (e.g., HTTP POST 201 Created) to the AMF 102 that may include a representation of the created UE context resource. Alternatively, if the designated context for SMS already exists, the SMSF 132, at 309, may update the UE context for SMS with parameters provided in the activation request and, at 311, transmit a success response (e.g., HTTP POST 204 No Content) to the AMF 102. If for some reason the activation or update may fail, in some embodiments, the SMSF 132 may return a failure response (e.g., HTTP POST 403 Forbidden) to the AMF 102.

Although not shown in FIG. 3, in some embodiments, the AMF 102 may deactivate SMS service for the particular user or customer UE. In some embodiments, the deactivation may occur by the AMF 102 sending an HTTP DELETE request to the SMSF 132 or, more specifically, to the resource representing the UE context for SMS in the SMSF. In response, the SMSF 132 may deactivate SMS service for the user or customer UE and delete the UE context for SMS from the SMSF. If successful, the SMSF 132 may transmit a success response (e.g., HTTP 204 No Content) to the AMF 102 or, if unsuccessful, a failure message (e.g., HTTP 403 Forbidden). In some embodiments, an NF service consumer (e.g., AMF 102) may use an HTTP POST in an UplinkSMS service operation to send an SMS on behalf of a customer UE. For example, the AMF 102 may transmit an HTTPS POST request to the SMSF 132 or, specifically, to the resource representing the UE context of the SMSF. The payload of the POST request may include the SMS message or record to be sent by the customer UE. In some embodiments, the SMSF 132 may then forward the SMS payload to another resource, such as an SMS router for transmission to a designated recipient. If successful, the SMSF 132 may return a success message (e.g., HTTP 200 OK) to the AMF 102.

In some embodiments, activation or deactivation may occur in response to a command from an entity, such as a requesting entity or other network entity. In some embodiments, the activation or deactivation may occur in response to a command received from a network entity through an interface or API (e.g., REST API) that may be associated with a client system, such as client system 204.

In some embodiments, a requesting entity using a requesting entity computing device, such as requesting entity computing device 202, may query the request details for any UE context resource that has been created for a UE on the SMSF 132. In some embodiments, such as at 316 in FIG. 3, the requesting entity may transmit a request for a UE context resource from a computing device of the requesting entity 202 to the AMF 102. In some embodiments, the request for the UE context resource may be sent directly to the SMSF 132 via an API or AMF API, or to the AMF via an interface with the client system 204, such as via REST interface 208 between the client system 204 and the AMF. In some embodiments, the request for the UE context resource may include a user identifier of the user or user equipment, such as an IMSI or another account identifier. The UE context resource may include information relating to the customer's UE or the account associated with the UE. For example, the UE context may include. In some embodiments, the information in the UE context may include information to maintain network services for the customer's UE, such as UE state information, security information, UE capability information, identities of UE-associated connections, etc, and other information that may be useful for troubleshooting and other inquiries. In some embodiments, the AMF 102 or other traffic node may check whether the requesting entity is registered with the NRF 126, such as before providing details relating to any UE context resource from the SMSF 132. At 318, the AMF 102 may query the SMSF 132 for a UE context resource associated with the user identifier provided by the requesting entity. In some embodiments, the UE context resource may be identified directly based on the user identifier, or in some embodiments, the AMF 102 may determine other identification information for the UE context resource based on the user identifier, such as by cross-checking a user identifier database. At 319, the SMSF 132 may identify the particular UE context resource requested and, at 320, the AMF 102 may receive the UE context resource from the SMSF in response to the query. In some embodiments, the AMF 102 may parse the UE context resource to identify particular information relevant to the requesting entity's query. In some embodiments, the AMF 102 may convert the received UE context resource to an API response. In some embodiments, the API response may be a REST API response. At 322, the AMF 102 may transmit the UE context resource to the requesting entity computing device 202. In some embodiments, the UE context resource transmitted to the requesting entity computing device 202 may be the parsed data from the UE context resource, and/or may be the converted UE context resource previously converted by the AMF 102 into an API response. In some embodiments, the requesting entity computing device 202 may receive the UE context resource via the REST interface or via a user data API, for example. In some embodiments, the user data API may provide access to information accessible via or stored directly on the AMF 102 via a client system.

As mentioned above, in some embodiments, the request for a UE context resource from the requesting entity computing device 202 may be made via a REST API interface with the AMF 102. In some embodiments, the request may include an HTTP POST message, or an HTTP POST message including a zero duration notification. In some embodiments, the request may include an HTTP GET request. In some embodiments, the request from the requesting entity computing device 202 for the UE context resource may be made directly to the SMSF 132, or directly to the SMSF via the client system 204, such as through the REST interface. In such embodiments, the SMSF 132 may check that the requesting entity may be registered with the NRF 112 as an NF and qualified to enable a request to the SMSF 132 to receive UE context resource details. In some embodiments, an application or other entity, such as via requesting entity server 206, may use an API to request details for a particular UE or user, and a user data API may include HTTP POST and/or HTTP GET requests. In such embodiments, the API may interface with the REST API and the SMSF 132 and/or the AMF 102, and may include a user interface or graphical user interface (GUI) that may receive identifying user information (e.g., international mobile subscriber information (IMSI), mobile station integrated services digital network (MSISDN), etc.) for the desired user and/or UE.

Figure 4:
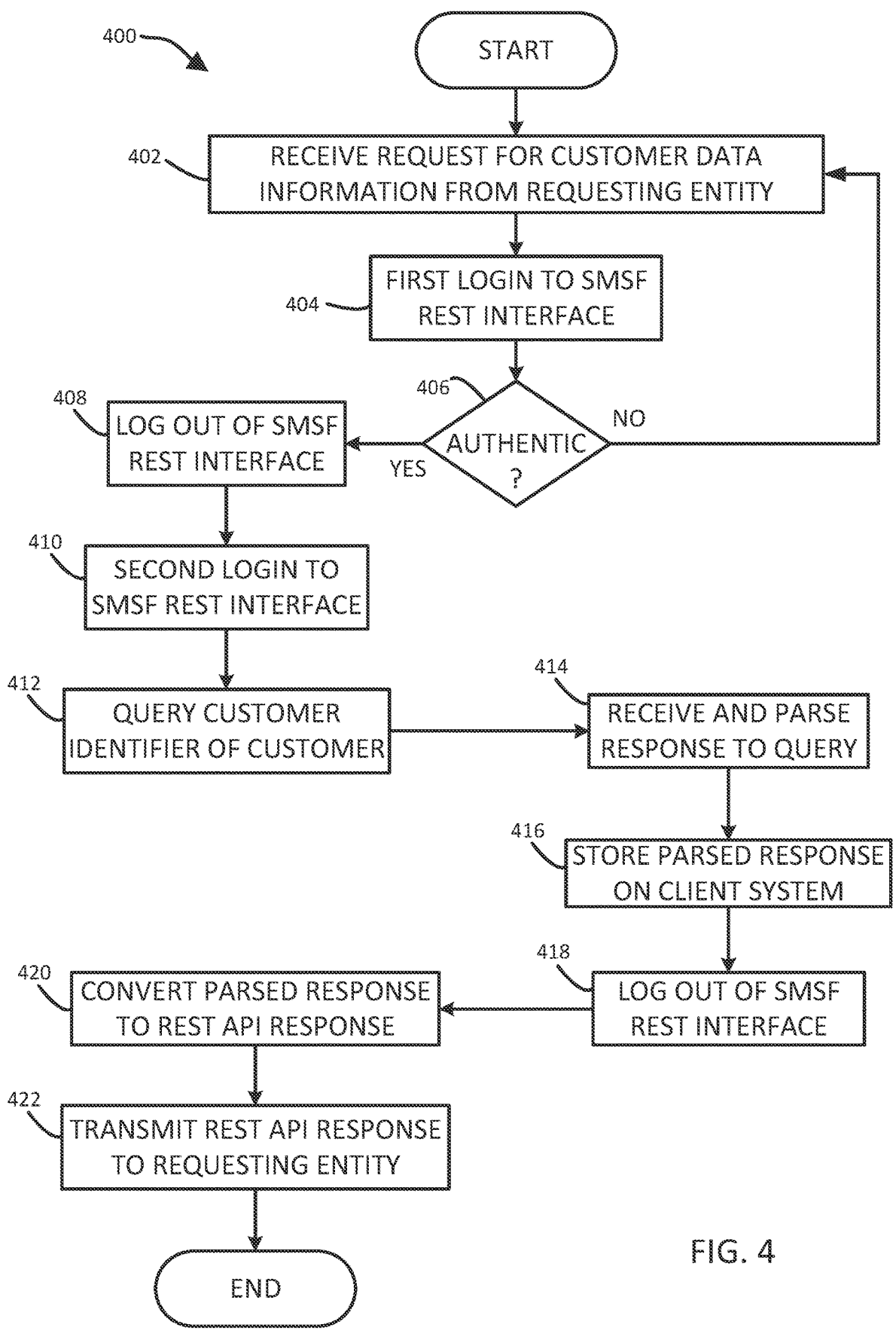
FIG. 4 is a flowchart of an embodiment of a method of improved access to user data in accordance with the disclosure.

In some embodiments, a client system may obtain current data for a particular UE context resource via the REST interface for an AMF or SMSF. The flow chart 400 in FIG. 4 illustrates an embodiment of a method to retrieve user data in accordance with the system and methods for accessing user data. In some embodiments, the user data may be retrieved via the user data API. At 402, the method may include receiving, at a client system such as client system 204, a request for user data from a requesting entity. In some embodiments, the request may come from a requesting entity computing device 202 or requesting entity server 206, such as those shown and described with reference to FIG. 2. In some embodiments, the request for user data may be in a REST API request format. In some embodiments, the request for user data may be a HTTP POST request, or an HTTP POST request with a zero duration notification. In some embodiments, the request for user data may be an HTTP GET request. At 404, in response to receiving the request, the client system may execute a first login to the SMSF via an SMSF REST interface. In some embodiments, an AMF may instead perform authentication. In such embodiments, the client system may execute a first login to the AMF via an AMF REST interface. At 406, the SMSF, such as SMSF 132 in FIG. 2, may authenticate the first login from the client system. In some embodiments, the authentication process may include checking that the requesting entity is registered with an NRF, such as NRF 126 in FIG. 2. In some embodiments, the authentication process may include determining whether the requesting entity may be registered with an NRF as a network function (NF). If the first login cannot be authenticated, the request may be denied. If the first login may be authenticated, the client system may logout of the SMSF REST interface at 408 and may execute a second login to the SMSF REST interface at 410. Once logged in for the second time, the client system may submit query on a user identifier of a particular user or customer UE with the SMSF. Once again, in some embodiments, the login process may occur via the AMF instead. In some embodiments, the query may be made using man-machine language (MML). In some embodiments, the user identifier may be an IMSI, MSISDN, or other identification unique to the particular user, user account, or particular customer UE. Once the SMSF runs the query, the client system may, at 414, receive a query response and parse the response to the query. At 416, the client system may store the query response and/or parsed query response on the client system. At 418, the client system may log out of the SMSF REST interface again, and at 420, the client system may convert the stored query response to a REST API response. At 422, the client system may send the REST API response to the requesting entity. In some embodiments, the REST API response may be in a format so as to provide the requested user data to the requesting entity.

One example of the MML request that may be entered to query a particular user's data is shown in Example 1 below:

Example 1: Show Subs Supi Imsi-310260173416064 Full where "imsi" may refer to International Mobile Subscriber Identity. The IMSI may be a unique number associated with the particular user's mobile phone or subscriber account. SUPI may refer to Subscription Permanent Identifier, which, in 5G network nomenclature, may be an abstraction of IMSI. Those skilled in the art will understand that, in some embodiments, other types of user identifiers may be used instead of or in addition to the IMSI. Additionally, those skilled in the art will understand that the MML request above is merely an example of one possible request, and that other requests in other programing languages may have a similar effect and still within the scope of the disclosure.

Of course, those skilled in the art will recognize that this is merely an example of possible converted API format, and that many other query response formats may be used within the scope of the disclosure. In some embodiments, once the user data retrieved from the query has been converted to API format, the data may be requested and received at substantially any time to identify if there may be current registration. In some embodiments, the process described above may be automated so that the client system may receive an input of a particular user identifier and/or login credentials, query the SMSF or AMF via the SMSF or AMF REST interface based on the user identifier, and return user data for the particular user.

Figure 5:
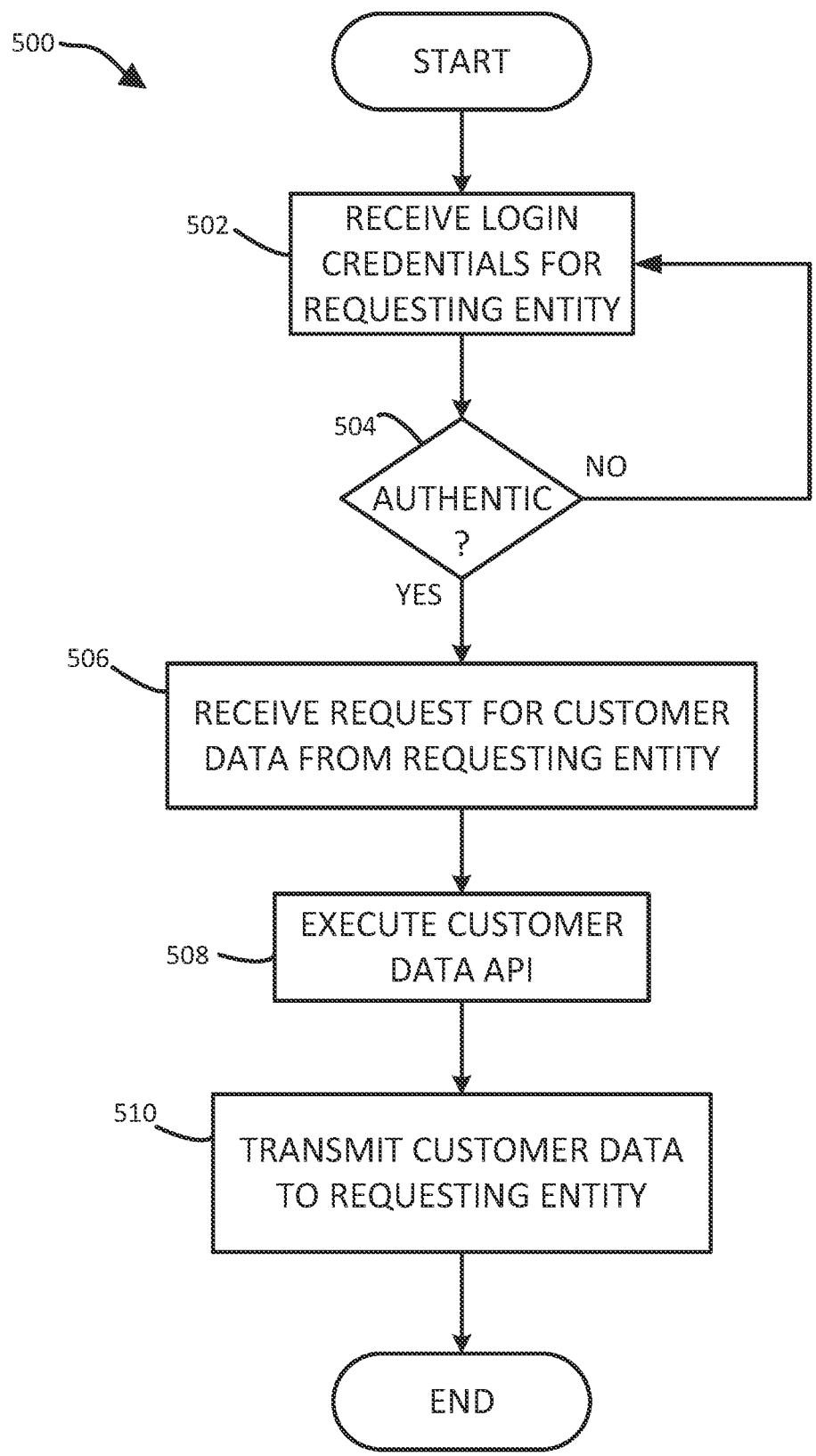
FIG. 5 is a flowchart of another embodiment of a method of improved access to user data in accordance with the disclosure.

In some embodiments, the process of requesting and receiving user data may be performed via the user data API. In some embodiments, the user data API may provide for a one-shot call of user data without subscribing to updates. In other words, a requesting entity may use the user data API to retrieve user data for a particular user or customer UE. FIG. 5 is a flow chart 500 illustrating an embodiment of a method of using the user data API to access user data. In some embodiments, at 502, the client system or another computing entity hosting the user data API may receive login credentials for a requesting entity, such as from a requesting entity computing device 202 or requesting entity server 206. At 504, if the login credentials cannot be authenticated, the process may stop or the user data API may request the credentials again. If the login credentials may be authenticated, the user data API may request a user identifier for a user for which the requesting entity seeks user data.

At 506, the user data API may receive a user identifier for a particular user, such as an IMSI, MSISDN, or other identifying information. At 508, the method may include executing the user data API to return the particular user or customer UE's data. In some embodiments, the user data API may query an SMSF to retrieve the requested data. In some embodiments, the user data API may be a REST API. In some embodiments, the user data API may use the SMSF REST interface to query information stored on the SMSF relating to users and customer UE. The user data API may include a HTTP GET request and/or an HTTP POST request, or other mechanisms to query and return user data or UE context resource data related to a UE. In some embodiments, the user data API may perform some or all of the steps shown and described in relation to FIG. 4 In some embodiments, the user data API may include code and response information similar to the commands and responses shown above with regard to Example 1, but other types of commands and responses may be used consistent with the teachings of the disclosure. Those of skill in the art will understand that the user data API may also operate in other ways consistent with the disclosure.

At 510, the user data API (e.g., via the client system) may transmit the retrieved user data to the requesting entity. The user data may include any of a variety of information. For example, the user data may UE context resource details, which may include information to maintain network services for the customer's UE, such as UE state information, security information, UE capability information, identities of UE-associated connections, and other information that may be useful for troubleshooting and other inquiries such as a general profile of the particular user's connection to the network, such as where the particular user may be identified in a cellular or data network, how the user may be registered, the internet protocol (IP) address of devices associated with a user, which systems in a network the user's device may be connected to (e.g., which AMF connected to which gNB, which SMSF, etc.), speed of the user device's connection to the network, etc. In some embodiments, the user data may also include a data network name (DNN), such as an access point name (APN).

The user data API and systems and methods described herein may provide technical solutions to the technical problem of quickly and efficiently accessing user data, and particularly efficiently accessing UE context resource details for a particular UE. For example, if a customer service agent needs to perform troubleshooting activities, the agent traditionally may encounter problems identifying user data quickly and efficiently, such as while the user is waiting on the phone, because accessing the desired information may include taking several burdensome steps. Such agents and other entities may benefit from the systems and methods described herein by providing a technical solution to quickly and easily accessing user data for a particular user or customer UE. In some instances, the particular user may be waiting on the phone with a problem, or be otherwise expecting a problem to be addressed quickly. In such instances, a customer service agent may use the user data API described herein to quickly access the user data, identify the source of a user's problems, and potentially solve those problems or determine additional actions that may help solve those problems. Accordingly, the system and methods described herein have a practical application of providing for improved customer support solutions through technical solutions related to improved computer resource and time efficiency. Further the system and methods described herein may represent an improvement in customer service technology, networking technology, network access technology, and/or data access technology.

Figure 6:
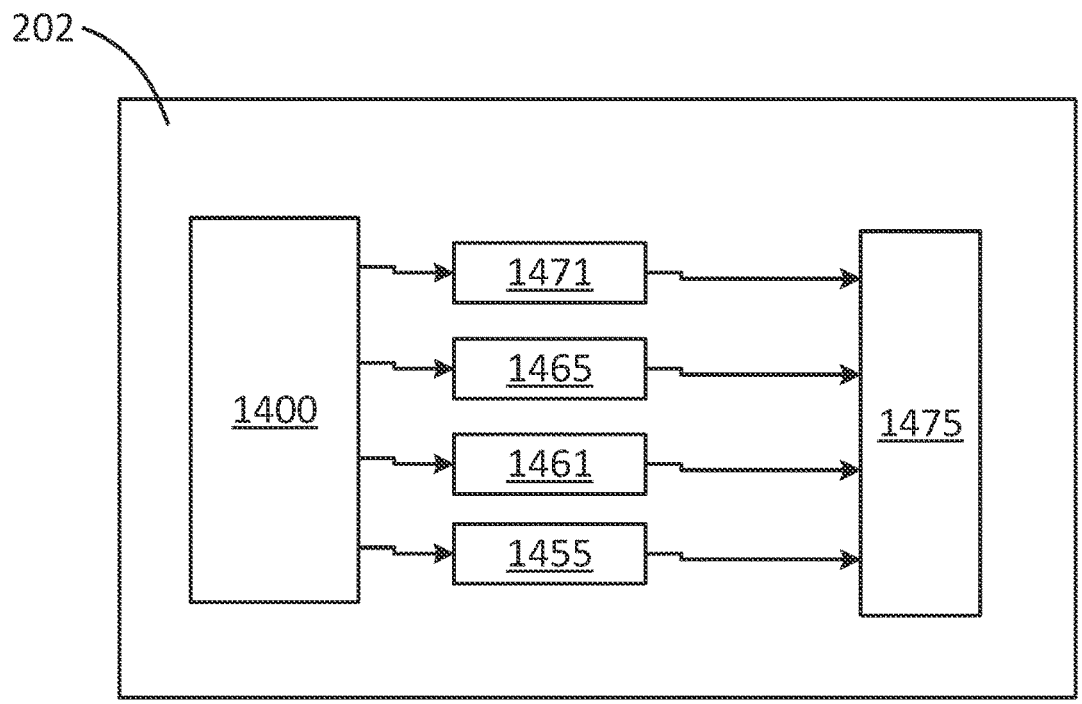
FIG. 6 is a schematic illustration of elements of an embodiment of an example computing device.
Figure 7:
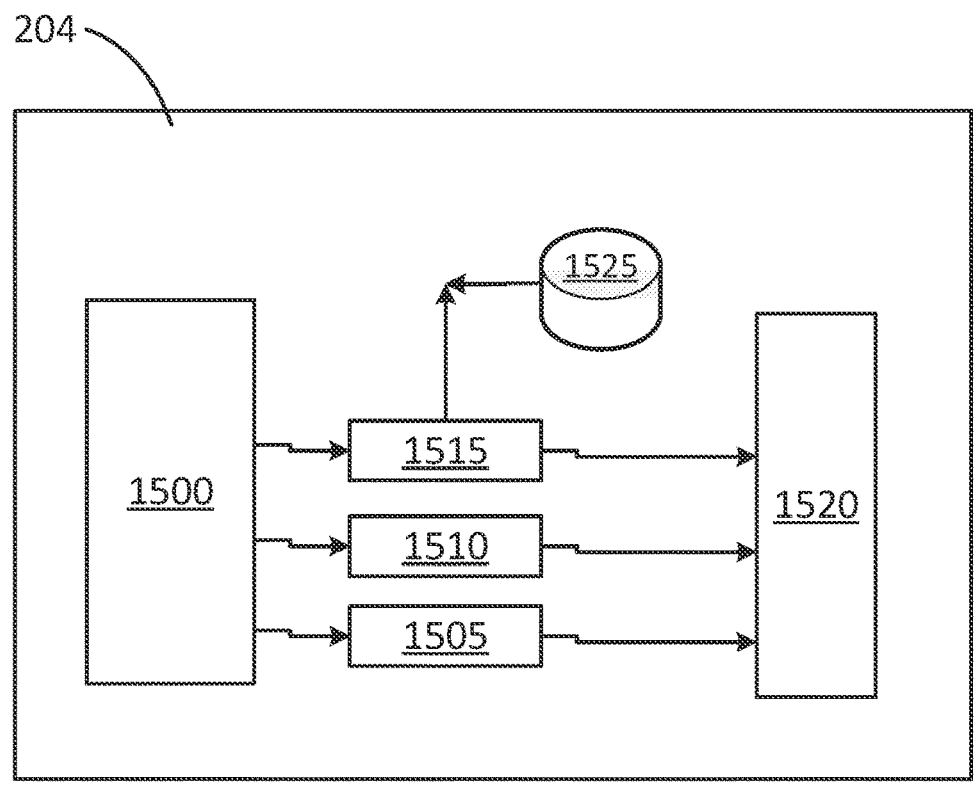
FIG. 7 is a schematic illustration of elements of an embodiment of a server type computing device.

FIG. 6 is a simplified illustration of the physical elements that make up an embodiment of a computing device, such as the requesting entity computing device 202, and FIG. 7 is a simplified illustration of the physical elements that make up an embodiment of a server type computing device, such as the client system server 204. Referring to FIG. 6, a sample computing device is illustrated that is physically configured to be part of the systems and method for improved access to user data. The computing device 202 may have a processor 1451 that is physically configured according to computer executable instructions. In some embodiments, the processor may be specially designed or configured to optimize communication between a server such as client system server 204 and the computing device 202 relating to the system described herein. The computing device 202 may have a portable power supply 1455 such as a battery, which may be rechargeable. It may also have a sound and video module 1461 which assists in displaying video and sound and may turn off when not in use to conserve power and battery life. The computing device 202 may also have volatile memory 1465 and non-volatile memory 1471. The computing device 202 may have GPS capabilities that may be a separate circuit or may be part of the processor 1451. There also may be an input/output bus 1475 that shuttles data to and from the various user input/output devices such as a microphone, a camera, a display, or other input/output devices. The computing device 202 also may control communicating with networks either through wireless or wired devices. Of course, this is just one embodiment of a computing device 202 and the number and types of computing devices 202 is limited only by the imagination.

The physical elements that make up an embodiment of a server, such as the client system server 204, are further illustrated in FIG. 7. In some embodiments, the client system server may be specially configured to run the system and methods for improved user data or the user data API as described herein. At a high level, the client system server 304 may include a digital storage such as a magnetic disk, an optical disk, flash storage, non-volatile storage, etc. Structured data may be stored in the digital storage a database. More specifically, the server 304 may have a processor 1500 that is physically configured according to computer executable instructions. In some embodiments, the processor 1500 can be specially designed or configured to optimize communication between a computing device, such as computing device 202, and the server 204 relating to the system as described herein. The server 204 may also have a sound and video module 1505 which assists in displaying video and sound and may turn off when not in use to conserve power and battery life. The server 204 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, a user data controller for running a user data API may be located on the computing device 202. However, in other embodiments, the user data controller may be located on client system server 204, or both the computing device 202 and the server 204. Of course, this is just one embodiment of the client system server 204 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for providing user data for a user in a cellular network, the method comprising:
   receiving, at a client system from a computing device of a requesting entity, an HTTP POST request including a user identifier of a user and a zero duration notification;
   in response to receiving the HTTP POST request, executing a first login with a network control node;
   executing a first logout out of the network control node;
   executing a second login with the network control node;
   querying the network control node for user data based on the user identifier;
   receiving the user data in response to the query;
   executing a second logout of the network control node; and
   transmitting the user data to the computing device of the requesting entity.

2. The method of claim 1, wherein the HTTP POST request is received via a representational state transfer (REST) application programing interface (API).

3. The method of claim 1, wherein the network control node is a short message service function (SMSF).

4. The method of claim 1, wherein the network control node authenticates login credentials of the first and second login with a network repository function (NRF).

5. The method of claim 1, where in the user data is a user equipment (UE) context resource.

6. The method of claim 1, wherein the user identifier is international mobile subscriber information (IMSI).

7. The method of claim 1, wherein at least querying the SMSF, receiving the UE context resource, parsing the received UE context resource, and converting the UE context resource are performed by a user data application programming interface (API).

8. A computer-implemented method for providing user data for a user in a cellular network, the method comprising:
   receiving a request for a user equipment (UE) context resource from a computing device of a requesting entity, the request including a user identifier of the user;
   providing login credentials associated with the requesting entity to a network control node;
   logging out of the network control node;
   providing the login credentials associated with the requesting entity a second time
   querying the network control node for the UE context resource based on the user identifier;
   receiving the UE context resource from the network control node in response to the query; and
   transmitting the UE context resource to the computing device of the requesting entity.

9. The method of claim 8, wherein providing login credentials associated with the requesting entity to the network control node includes interfacing with the network control node via a representational state transfer (REST) interface.

10. The method of claim 8, wherein providing login credentials associated with the requesting entity to the network control node includes submitting a POST request.

11. The method of claim 8, wherein providing login credentials associated with the requesting entity to the network control node includes submitting a GET request.

12. The method of claim 8, wherein the user identifier is international mobile subscriber information (IMSI).

13. The method of claim 8, wherein at least querying the network control node and receiving the UE context resource are performed by a user data application programming interface (API).

14. The method of claim 8 further comprising authenticating the login credentials with a network repository function (NRF).

15. The method of claim 8 further comprising converting the received UE context resource to an application programming interface (API) response.

16. The method of claim 15 wherein the API response is a representational state transfer (REST) API response.

17. The method of claim 8, wherein the request is an HTTP POST request.

18. A system for providing access to user data for a user in a cellular network, the system comprising:
   a control node of the cellular network; and
   a client system configured to:
      receive a request for user data from a computing device of a requesting entity, the request for user data including a user identifier of the user;
      log out of the network control node;
      provide the login credentials associated with the requesting entity a second time;
      query the control node for the user data based on the user identifier;
      receive the user data in response to the query; and
      transmit the user data to the computing device of the requesting entity.

19. The system of claim 18, wherein the control node is an access and short message service function (SMSF).

* * * * *